United States Patent
Aihsan et al.

(10) Patent No.: US 9,337,881 B2
(45) Date of Patent: May 10, 2016

(54) APPARATUS FOR PROVIDING INFORMATION ON A TOP SECTION OF A PORTABLE RADIO

(71) Applicant: MOTOROLA SOLUTIONS, INC, Schaumburg, IL (US)

(72) Inventors: Mohd Wardi Iswali Aihsan, Lunas (MY); Chee Kit Chan, Ipoh (MY); Eng Wiang Chan, Bayan Lepas (MY); Shirish Kaner, Persiaran Bayan Indah (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 120 days.

(21) Appl. No.: 14/087,250

(22) Filed: Nov. 22, 2013

(65) Prior Publication Data
US 2015/0147982 A1  May 28, 2015

(51) Int. Cl.
| | |
|---|---|
| H04B 1/3827 | (2015.01) |
| H04B 1/401 | (2015.01) |
| H04B 1/3888 | (2015.01) |
| G06F 1/16 | (2006.01) |
| G02F 1/167 | (2006.01) |
| G06F 3/147 | (2006.01) |
| H04M 1/02 | (2006.01) |

(52) U.S. Cl.
CPC ............ *H04B 1/3833* (2013.01); *H04B 1/3827* (2013.01); *H04B 1/3888* (2013.01); *H04B 1/401* (2013.01); *G02F 1/167* (2013.01); *G06F 1/1601* (2013.01); *G06F 3/147* (2013.01); *H04M 1/0268* (2013.01)

(58) Field of Classification Search
CPC combination set(s) only.
See application file for complete search history.

(56) References Cited

U.S. PATENT DOCUMENTS

| | | | |
|---|---|---|---|
| 5,818,401 A | 10/1998 | Wang | |
| 6,215,480 B1 | 4/2001 | Danis et al. | |
| 6,618,601 B1 * | 9/2003 | Tatehana | H01Q 1/06 379/433.01 |
| 7,535,426 B2 | 5/2009 | Burnham et al. | |
| 8,011,594 B2 | 9/2011 | Johnson et al. | |
| 8,442,600 B1 | 5/2013 | Tseng | |
| 8,482,836 B2 | 7/2013 | Luan et al. | |
| 8,482,909 B2 | 7/2013 | Douglas et al. | |
| 2007/0024954 A1 * | 2/2007 | Sakamoto | G02F 1/133514 359/296 |

(Continued)

FOREIGN PATENT DOCUMENTS

| | | |
|---|---|---|
| EP | 1487050 A1 | 12/2004 |
| EP | 2432195 A1 | 3/2012 |

(Continued)

OTHER PUBLICATIONS

"The World's Thinnest Watch" Press Release: www.eink.com/press_releases/cst01_eink_101813.html copyright 2012 E Ink Corporation.

(Continued)

*Primary Examiner* — Yuwen Pan
*Assistant Examiner* — Zhitong Chen (57) ABSTRACT

A portable radio includes a display component configured to display information on a top section of the portable radio. The display component also includes a housing, wherein a top section of the housing is coupled to a bottom section of at least one of an antenna and a knob. The portable radio also includes an interface connector having a top section coupled to a bottom section of the housing of the display component. A bottom section of the interface connector is coupled to a hardware attachment on the top section of the portable radio.

20 Claims, 7 Drawing Sheets

(56) References Cited

U.S. PATENT DOCUMENTS

| | | | | |
|---|---|---|---|---|
| 2007/0232266 | A1* | 10/2007 | Pinder | H01Q 1/088 455/411 |
| 2010/0116758 | A1 | 5/2010 | Colin et al. | |
| 2011/0195786 | A1* | 8/2011 | Wells | G07F 9/026 463/42 |
| 2013/0076612 | A1* | 3/2013 | Myers | G06F 1/1626 345/156 |
| 2013/0080670 | A1* | 3/2013 | Medica | G06F 1/1626 710/110 |

FOREIGN PATENT DOCUMENTS

| | | |
|---|---|---|
| WO | 2007018348 A1 | 2/2007 |
| WO | 2009075577 A1 | 6/2009 |

OTHER PUBLICATIONS

Corresponding International Application No. PCT/US2014/066345—International Search Report with Written Opinion, mailing dated Feb. 27, 2015.

* cited by examiner

APPARATUS FOR PROVIDING INFORMATION ON A TOP SECTION OF A PORTABLE RADIO

BACKGROUND OF THE INVENTION

Figure 1:
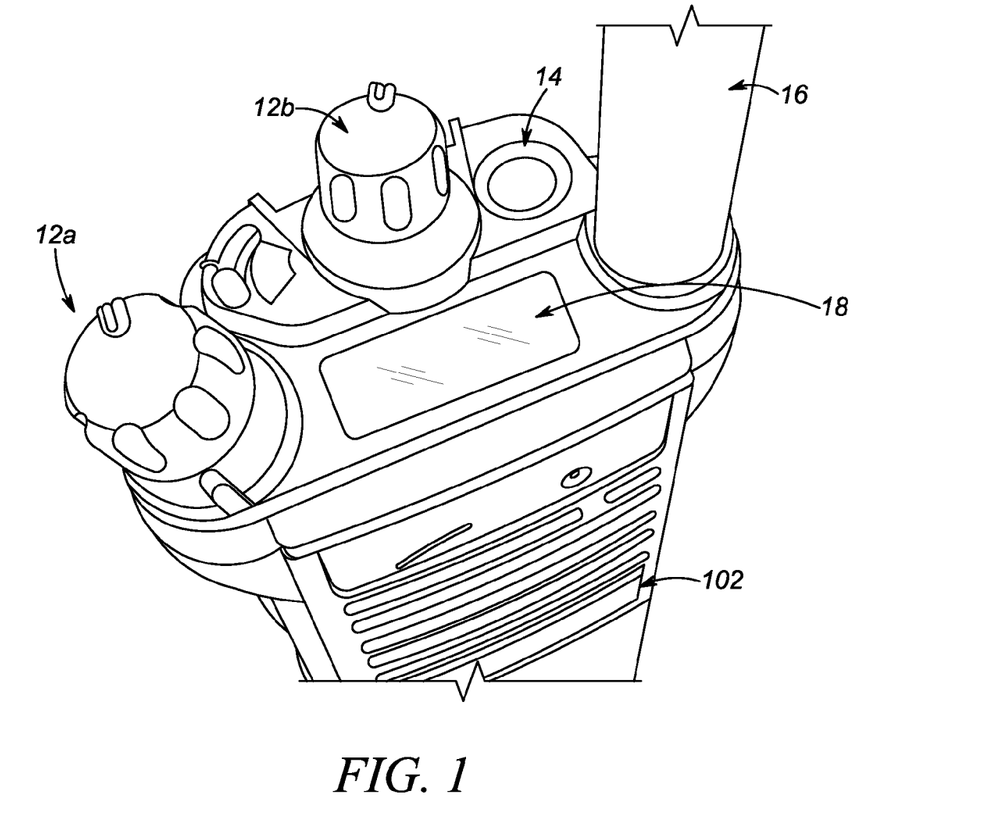
FIG. 1 is a diagram of a portable radio.

The top section of a portable radio 102, as shown in FIG. 1, may include one or more knobs 12 (i.e., knobs 12a and 12b) which may be used, for example, for adjusting the volume of portable radio 102 or changing a channel on which portable radio 102 operates. The top section of portable radio 102 may also include an emergency button 14, an antenna 16 and/or a display 18. The size of the top section of portable radio 102 restricts the number and types of controls 12-16 and the size of the display 18 that can be included on this part of portable radio 102. As the sizes of portable radios are reduced, there is a challenge during the design phase of incorporating all of the necessary components on the top section with full usability. As a result, the sizes of items included in the top sections portable radios may be manipulated. For example, one or more knobs 12 included in the top section may be made smaller. However, the sizes of items can only be reduced up to a point, beyond which the items may be unusable.

Display 18 provided on the top section of portable radio 102 may be provided in addition to a display (not shown) provided on the front face of portable radio 102. Display 18 may be used to show critical information, for example, the frequency on which the radio operates, or status information, for example, the battery charge level or the current volume. Information shown on display 18 is shown in one dimension and may only be visible by looking directly at the face of the top section of portable radio 102. If display 18 which is incorporated into the top section of portable radio 102 malfunctions, it cannot be easily changed, i.e., display 18 cannot be changed without taking the top section of portable radio 102 apart. Although other components of portable radio 102 may operate properly, when display 18 malfunctions, a user of portable radio 102 may be unable to easily receive and view the critical information or the status information shown on display 18.

Accordingly, there is a need for an improved method and apparatus for providing information on the top section of a portable radio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for providing information on the top section of a portable radio. The portable radio includes a display component configured to display information on a top section of the portable radio. The display component also includes a housing, wherein a top section of the housing is coupled to a bottom section of at least one of an antenna and a knob. The portable radio also includes an interface connector having a top section coupled to a bottom section of the housing of the display component. A bottom section of the interface connector is coupled to a hardware attachment on the top section of the portable radio.

Figure 2:
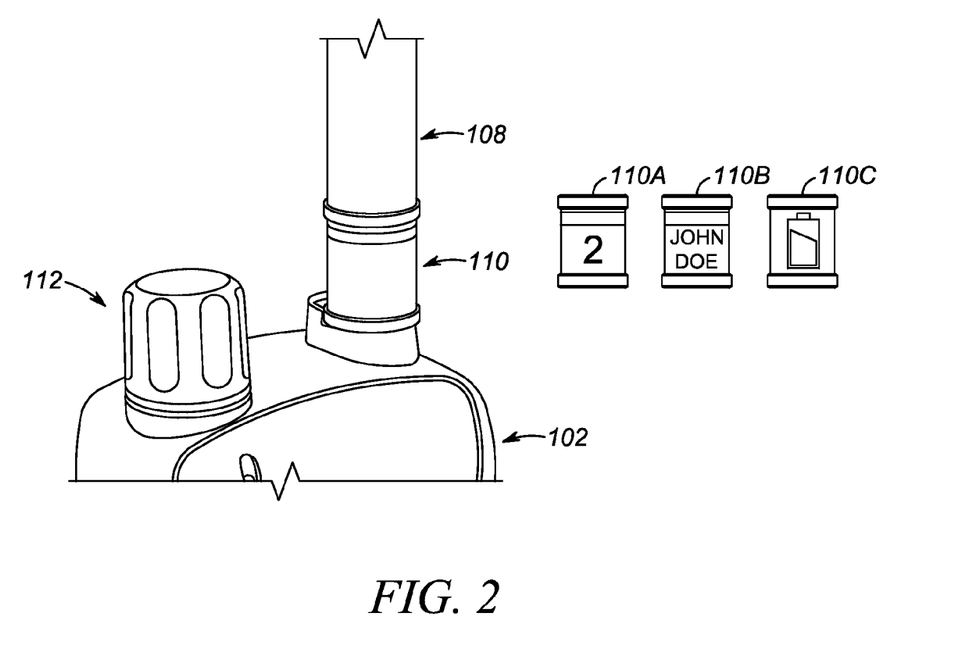
FIG. 2 is a diagram of an info-core display incorporated in a top section of the portable radio in accordance with some embodiments.

FIG. 2 is a diagram of an info-core display incorporated in a top section of a portable radio 102 (also referred to as radio 102) in accordance with some embodiments. An antenna 108 is connected to the top portion of an info-core display 110 so that info-core display 110 can become integrated with antenna 108. Info-core display 110 is configured to display information (examples of which are shown in 110A, 110B and 110C) in the top section of radio 102. Info-core display 110 may be used to show critical information or status information. Non-limiting examples of critical information may include an identifier for radio 102, the frequency on which radio 102 operates, or an operating mode (for example, emergency mode or non-emergency mode) of radio 102. Non-limiting examples of status information may include a battery charge level or a current volume level. Info-core display 110 is shown as a cylindrical display, wherein information shown on info-core display 110 may be viewed almost in 360 degrees, i.e., the information shown on info-core display 110 may be viewed from a front section, a back section and/or side sections of radio 102.

It should be noted that info-core display 110 may also be integrated with other items on the top section of radio 102. For example, info-core display 110 may be attached to knob 112, as an alternative to or in addition to being integrated with antenna 108. Info-core display 110 may be added to or removed from items (for example, antenna 108 or knob 112), without changing how those items operate. Consider for example that info-core display 110 is detached from antenna 108. In such an example, antenna 108 may be attached directly to the top section of radio 102 in order for radio 102 to use antenna 108. At a subsequent time, info-core display 110 may be attached (or reattached) to antenna 108, thereby enabling radio 102 to display information on info-core display 110 while radio 102 continues to access the functions of antenna 108.

Figure 3:
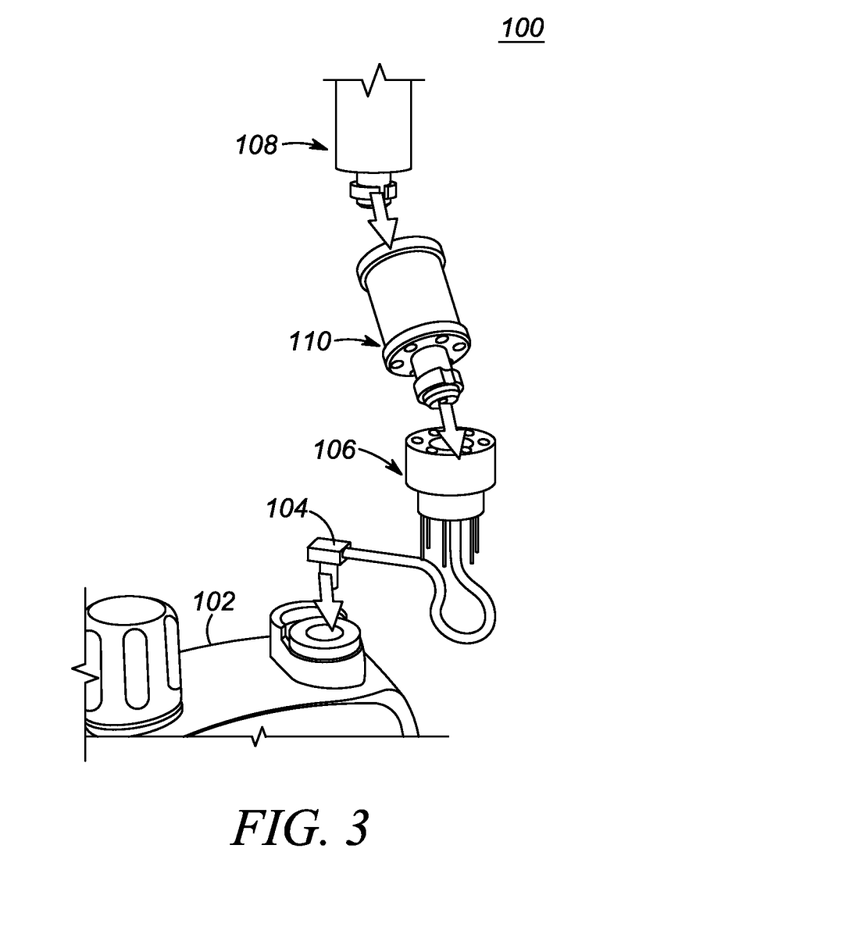
FIG. 3 is a diagram of an info-core display configuration in accordance with some embodiments.

FIG. 3 is a diagram of an info-core display configuration 100 in accordance with some embodiments. The bottom of info-core display 110 is connected to radio 102 through an interface connector 106 which serves as an interface between info-core display 110 and radio 102. Interface connector 106 includes electrical contact pins that may be connected to a wiring scheme or flexible printed circuit that is connected to a printed circuit board (PCB)/motherboard in radio 102. The PCB may be programmed to control information shown on info-core display 110. For example, the PCB may be programmed to control what type of information is displayed on info-core display 110, the length of time a given type of information (for example, a battery charge level) is displayed on info-core display 110, and the rate at which information displayed on info-core display 110 is updated or changed. The electrical contact pins may be used to power up and process information displayed on info-core display 110 based on signals received from the PCB in radio 102. Interface connector 106 may also include a coaxial cable that is connected to a housing 104 and further connected to the PCB or other electrical component in radio 102. The coaxial cable protects radio frequency (RF) signals transmitted through, for example, a connected 50 ohms antenna port of antenna 108 from external electromagnetic interference. The top of info-core display 110 is connected to antenna 108 such that the integrated info-core display 110 and antenna 108 carries an antenna port and a connection for the coaxial cable.

Figure 4:
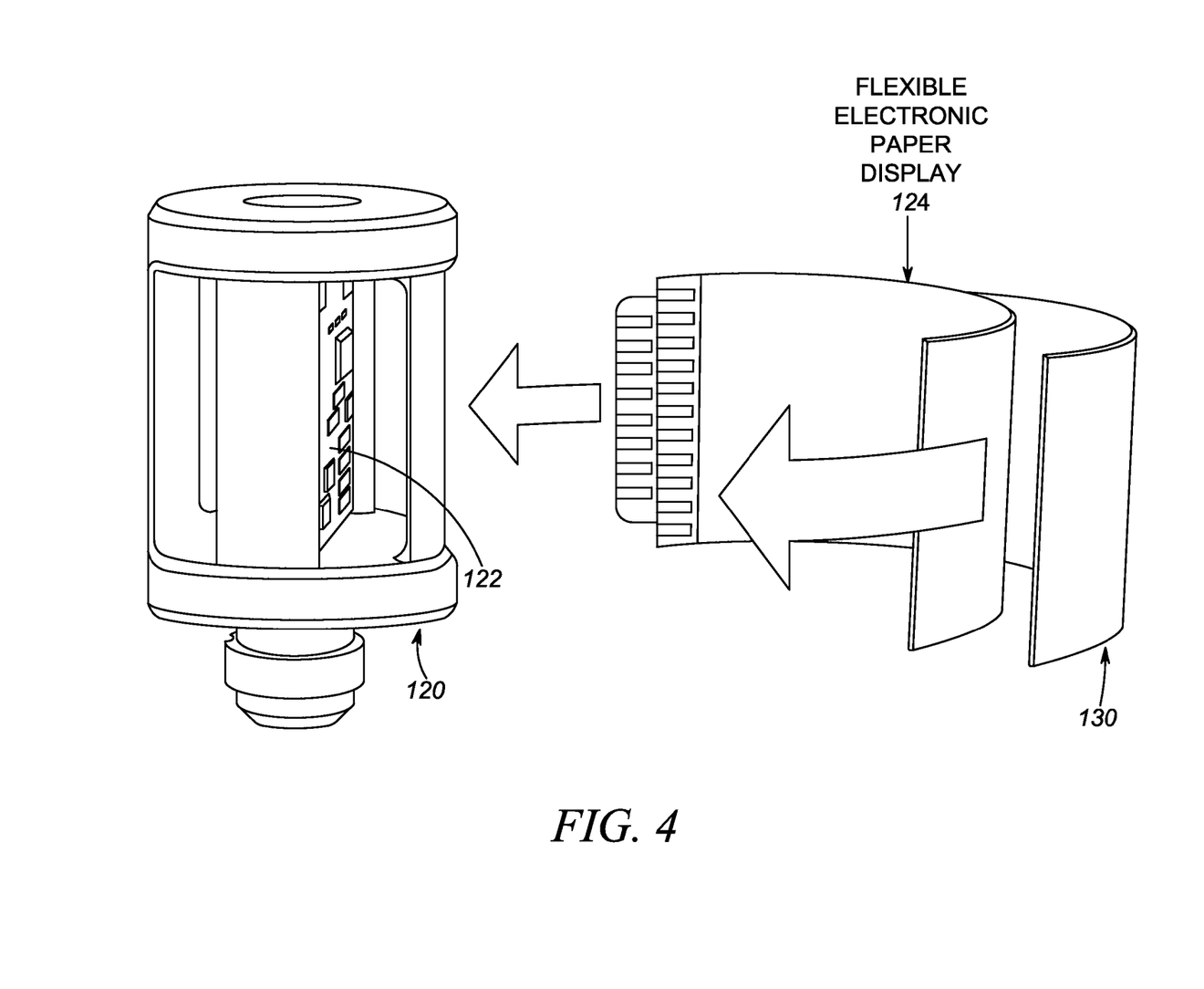
FIG. 4 is a diagram of an info-core display construction in accordance with some embodiments.

FIG. 4 is a diagram of an info-core display construction in accordance with some embodiments. A housing 120 of info-core display 110 includes a PCB 122 that is connected to the motherboard (not shown) of radio 102 via the electrical contact pins in interface connector 106, as shown for example in FIG. 3. Housing 120 may be, for example, a plastic housing on which a flexible electronic paper display 124 is mounted/wrapped. Flexible electronic paper display 124 (also known as e-paper or electronic ink) is designed to mimic the appearance of ordinary ink on paper and reflect light like ordinary paper. Flexible electronic paper display 124 may be mounted on housing 120, for example, by using flex connection onto the PCB 122. A protective shield 130 may be placed over flexible electronic paper display 124 to protect flexible electronic paper display 124 from damage. The shape of housing 120 may be, for example, rectangular, cylindrical, or any other shape. Regardless of the shape of housing 120, information shown in info-core display 110 may be viewed from one or more angles and directions.

Figure 5A:
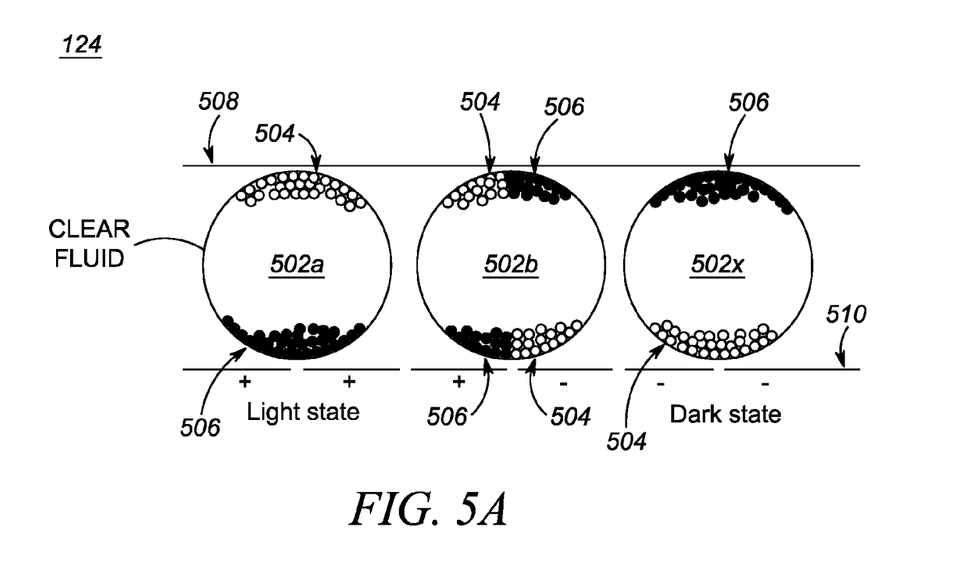
FIG. 5A-5B set forth cross sectional views of a flexible electronic paper display used in accordance with some embodiments.
Figure 5B:
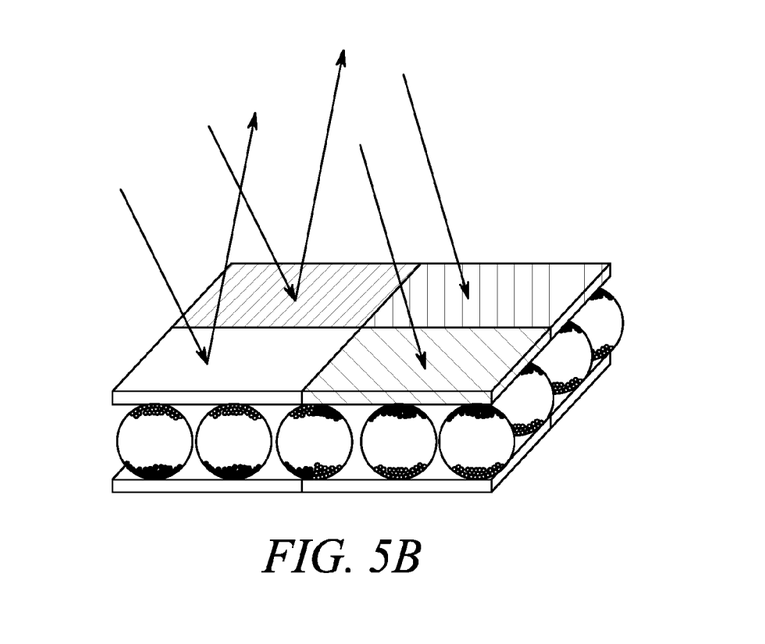

FIG. 5A is a cross sectional view of a flexible electronic paper display used in accordance with some embodiments. Flexible electronic paper display 124 is form by multiple micro-capsules 502 (i.e., 502a-502x), each of which contains white pigments 504 and black pigments 506. Positively charged white pigments 504 are attracted to negative voltage (as shown as the bottom of 502x) while the negatively charged black pigments 506 are attracted to positive voltage (as shown as the bottom of 502a). Thus, different ON or OFF stage patterns can be display when different voltage is driven across transparent electrodes on a top section 508 and electrodes on the bottom section 510 of flexible electronic paper display 124. Sub-capsule addressing enables high resolution display capability. Full dot matrix can be achieved when horizontal transparent electrodes and vertical transparent electrodes are designed on the flexible electronic paper display to achieve a desired display resolution. The existence of color filters on the top of flexible electronic paper display 124 allows flexible electronic paper display 124 to show color. In FIG. 5B the four sections on the top of flexible electronic paper display 124 represent color filters, where, for example, the left front section of the top of flexible electronic paper display 124 may represent white color filters, the left back section of the top of flexible electronic paper display 124 may represent red color filters, the right front section of the top of flexible electronic paper display 124 may represent blue color filters, the right back section of the top of flexible electronic paper display 124 may represent green color filters.

Figure 6:
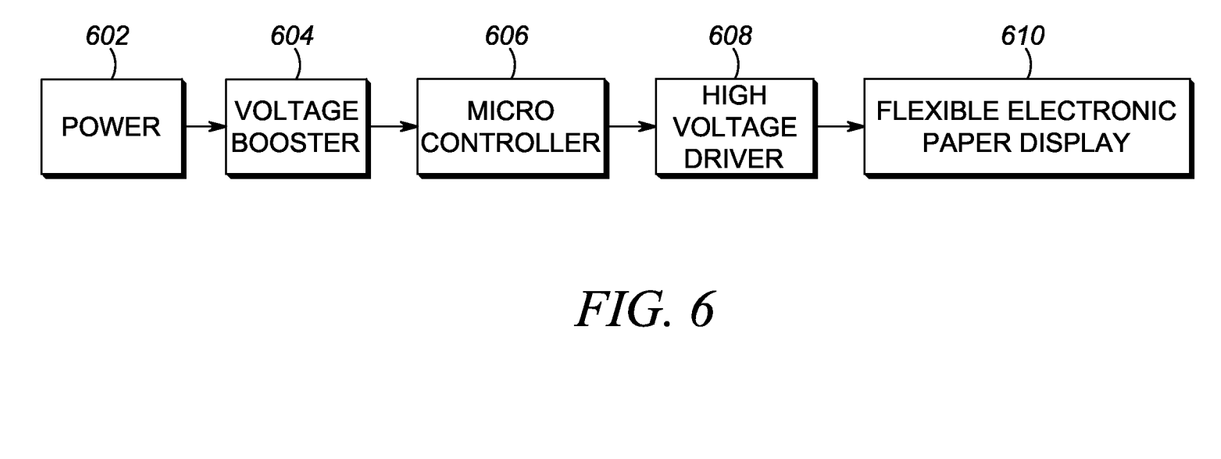
FIG. 6 sets forth how an electrical signal is processed by the info-core display in accordance with some embodiments.

FIG. 6 sets forth how an electrical signal is processed by the info-core display in accordance with some embodiments. A power supply input, shown at 602, goes through a voltage booster at 604. At 606, the power is supplied to a microcontroller which will generate an electrical signal to drive a high voltage driver, at 608, located on the flexible electronic paper display. Subsequently, at 610, the output signal from the driver will control the on and off stage of the pixel at flexible electronic paper display to display a desired pattern.

Figure 7:
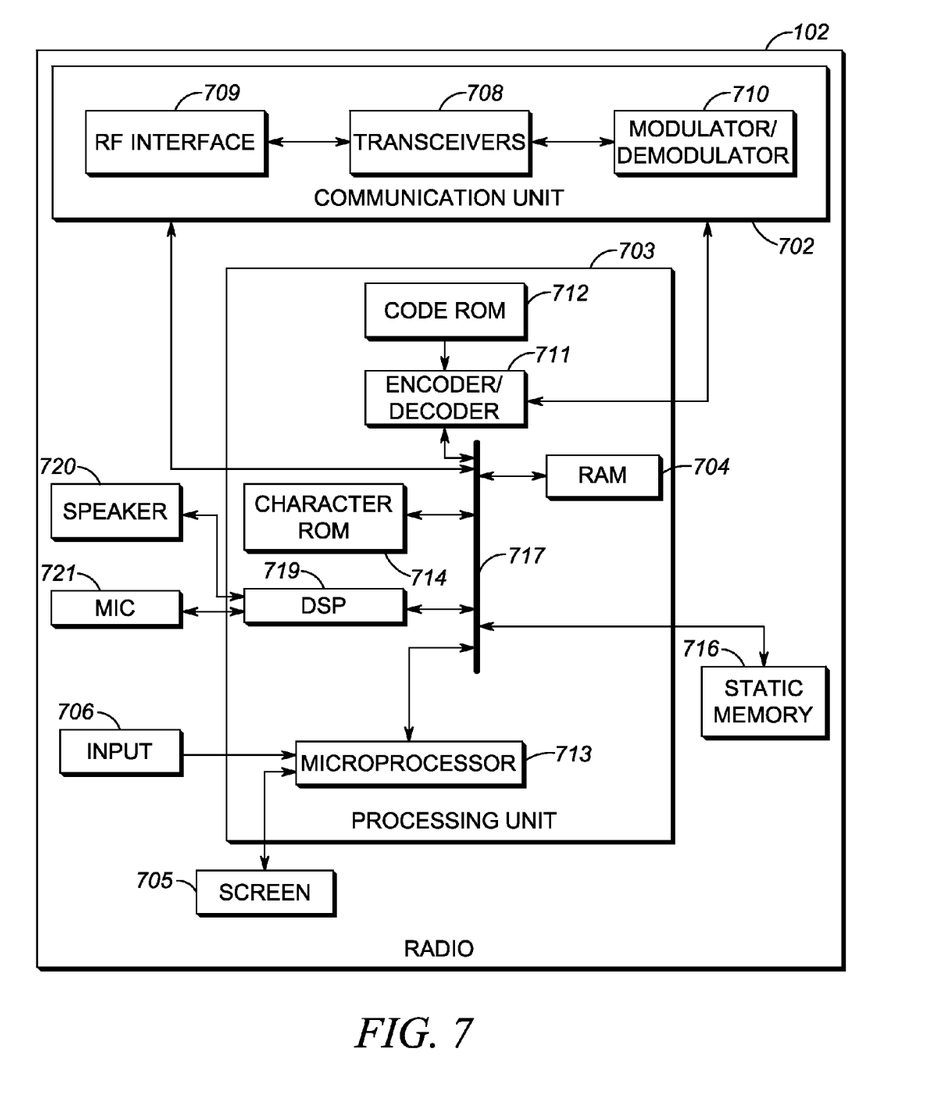
FIG. 7 is a further diagram of a portable radio used in accordance with some embodiments.

FIG. 7 is a further block diagram of a radio used in accordance with some embodiments. Radio 102 includes a communications unit 702 coupled to a common data and address bus 717 of a processing unit 803. Radio 102 may also include an input unit (e.g., keypad, pointing device, etc.) 706, an output transducer unit (e.g., speaker) 720, an input transducer unit (e.g., a microphone) (MIC) 721, and a display screen 705, each coupled to be in communication with the processing unit 703. The speaker/microphone configuration may be configured with Push-To-Talk capability and/or Voice over IP (VoIP) capability. Note that display screen 705 is different from info-core display 110 that displays information on the top section of radio 102.

Processing unit 703 may include an encoder/decoder 711 with an associated code ROM 712 for storing data for encoding and decoding voice, data, control, or other signals that may be transmitted or received by radio 102. Processing unit 703 may further include a microprocessor 713 coupled, by the common data and address bus 717, to the encoder/decoder 711, a character read only memory (ROM) 714, a random access memory (RAM) 704, and a static memory 716. The processing unit 703 may also include a digital signal processor (DSP) 719, coupled to the speaker 720, the microphone 721, and the common data and address bus 717, for operating on audio signals received from one or more of the communications unit 702, the static memory 716, and the microphone 721.

Communications unit 702 may include an RF interface 709 configurable to communicate with network components, and other user equipment within its communication range. Communications unit 702 may include one or more broadband and/or narrowband transceivers 708, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 702 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 710 that is coupled to the encoder/decoder 711.

The character ROM 714 stores code for decoding or encoding data such as control, request, or instruction messages, channel change messages, and/or data or voice messages that may be transmitted or received by radio 102. Static memory 716 may store operating code for controlling the info-core display 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio comprising:
   an antenna and a knob;
   a display component configured to display information on a top section of the portable radio, the display component comprising a flexible electronic paper display wrapped around a cylindrical housing to display the display information around substantially 360 degrees, the electronic paper being selectively controlled to display critical radio information or status information, wherein the critical radio information is selected from radio frequency, radio identifier, or emergency mode; and the status information is selected from volume level, battery charge level, or non-emergency mode, wherein a top section of the cylindrical housing is coupled to a bottom section of at least one of the antenna and the knob; and
   an interface connector having a top section coupled to a bottom section of the cylindrical housing of the display component, wherein a bottom section of the interface connector is coupled to a hardware attachment on the top section of the portable radio.

2. The portable radio of claim 1, wherein the interface connector comprises electrical pins connected to a circuit board in the portable radio, wherein the interface connector is configured to power up the display component based on signals received from the circuit board.

3. The portable radio of claim 2, wherein the circuit board is programmed to control information shown on the display component.

4. The portable radio of claim 1, wherein the interface connector comprises a coaxial cable, wherein a first end of the coaxial cable is configured to connect to at least one hardware component on the portable radio and a second end of the coaxial cable is configured to connect to the bottom section of the cylindrical housing of display component.

5. The portable radio of claim 4, wherein the coaxial cable is configured to protect radio frequency signals transmitted through the antenna and the display component from interference.

6. The portable radio of claim 1, wherein the cylindrical housing includes a first circuit board for processing information shown on the display component, wherein the first circuit board is connected to a second circuit board in the portable radio that is configured to control the first circuit board.

7. The portable radio of claim 1, wherein the flexible electronic paper display is formed by a plurality of micro-capsules.

8. The portable radio of claim 7, wherein information is displayed on the display component based on how voltage is driven across electrodes on the flexible electronic paper display.

9. The portable radio of claim 7, wherein a protective shield is placed over the flexible electronic paper display.

10. The portable radio of claim 1, wherein the display component is configured to be attachable and removable from one of the antenna and the knob without changing functions of the antenna and the knob when the antenna and the knob is attached to the top section of the portable radio.

11. The portable radio of claim 7, wherein the plurality of micro-capsules include a plurality of black pigments that are attracted to positive voltage when negatively charged and a plurality of white pigments that are attracted to negative voltage when positively charged.

12. The portable radio of claim 1, wherein the flexible electronic paper display further comprises an electrode top section and an electrode bottom section, wherein information is displayed based on how voltage is driven across the electrode top section and the electrode bottom section of the flexible electronic paper display.

13. The portable radio of claim 1, wherein the cylindrical housing comprises a circuit board for processing information shown on the flexible electronic paper display.

14. The portable radio of claim 1, wherein the antenna is an exterior antenna of the portable radio and the knob is an exterior knob of the portable radio.

15. The portable radio of claim 1, further comprising at the portable radio:
   a microprocessor; and
   a static memory coupled to the microprocessor, the static memory for storing operating code for controlling the flexible electronic paper display.

16. A portable radio, comprising:
   a portable radio housing comprising a front section, a back section, first and second side sections, and a top section, the top section having a plurality of radio controls located thereon; and
   a display component attachable to and detachable from the plurality of radio controls, wherein the display component comprises:
   a cylindrical housing;
   a flexible electronic paper display wrapped around the cylindrical housing; and
   an electronic printed circuit board (pcb) within the cylindrical housing for communicating with a motherboard of the portable radio, the pcb being programmed to selectively control displaying critical radio information or status information, the critical radio information being selected from radio frequency, radio identifier, or emergency mode; and the status information being selected from volume level, battery charge level, or non-emergency mode.

17. The portable radio of claim 1, further comprising:
   color filters on the top of flexible electronic paper display hey allowing the flexible electronic paper display to show color.

18. The portable radio of claim 16, wherein the portable radio is a push-to-talk radio.

19. The portable radio of claim 16, wherein the plurality of radio controls comprises at least a knob and an antenna.

20. The portable radio of claim 1, wherein the portable radio is a public safety radio.

* * * * *